Figure 1:
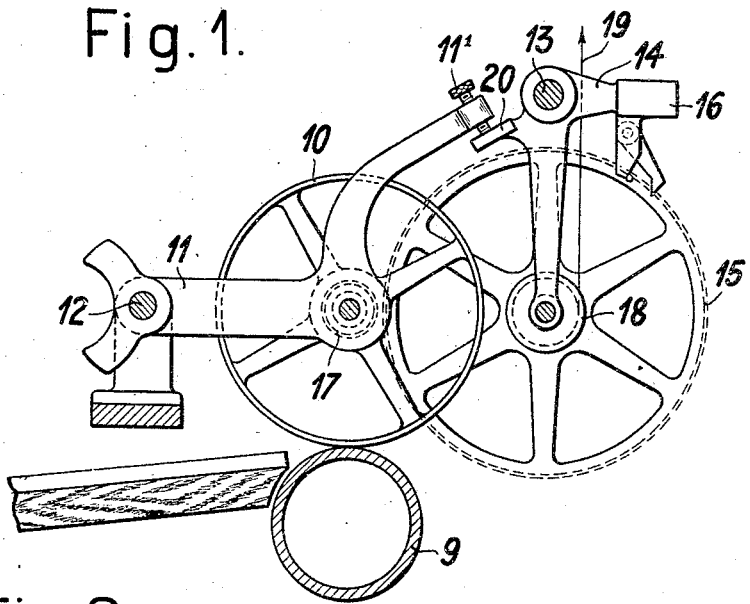

May 13, 1924.  
H. THUN  
SURFACE MEASURING MACHINE  
Filed March 4, 1922    2 Sheets-Sheet 1

Inventor:
Hermann Thun,
By Knight Bros.
Attys

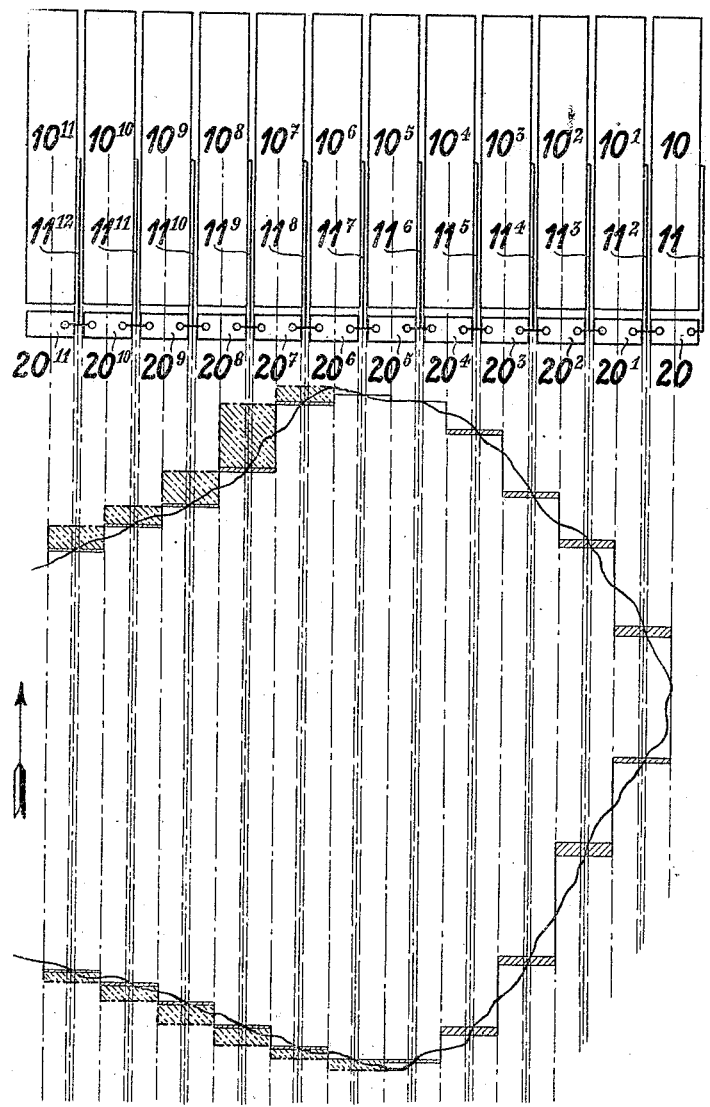

Patented May 13, 1924.

1,493,829

UNITED STATES PATENT OFFICE.

HERMANN THUN, OF ESSEN, GERMANY, ASSIGNOR TO FRIED. KRUPP AKTIEN-GESELLSCHAFT, OF ESSEN-ON-THE-RUHR, GERMANY.

SURFACE-MEASURING MACHINE.

Application filed March 4, 1922. Serial No. 541,132.

*To all whom it may concern:*

Be it known that I, HERMANN THUN, residing at Essen, Germany, a citizen of the German Republic, have invented a certain new and useful Improvement in Surface-Measuring Machines, of which the following is a specification.

This invention relates to a surface measuring machine particularly destined for measuring the areas of pieces of leather and in which the surface to be measured is divided, by means of equally spaced measuring wheels, in strips of equal width the length of which is measured and added, the total being indicated by an indicating mechanism.

The object of the present invention is to improve machines of this kind so that their structure becomes simpler and more compact than that of other machines of the kind mentioned.

The invention is illustrated diagrammatically in the drawing.

Figure 2:
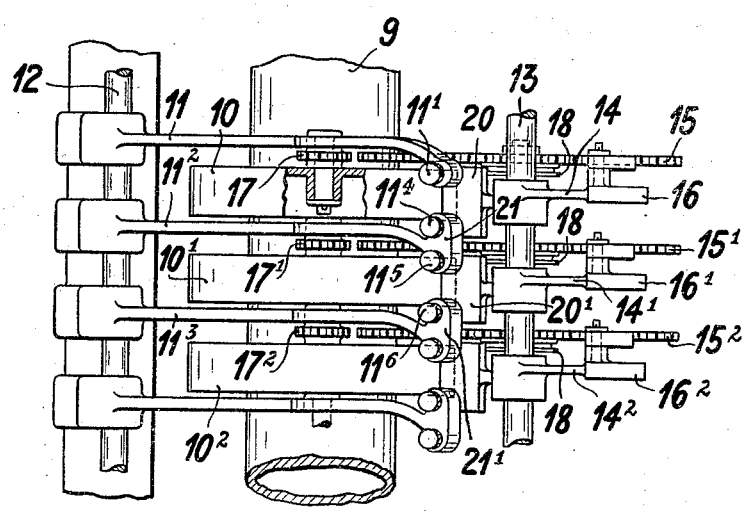

Fig. 1 illustrates a cross-section of the machine, the parts unessential to the invention being omitted, Fig. 2 is a plan view of the same, partly in section, and Fig. 3 is a schematic representation illustrating the method of operation of the machine.

The machine will first be described with reference to Figs. 1 and 2.

On the feeding drum 9 lie equally spaced measuring wheels 10, $10^1$, $10^2$, etc., of which 10 represents the first measuring wheel of the machine. These wheels are journalled in levers 11, $11^2$, $11^3$, etc., which can swing about a fixed shaft 12 and each of which carries, besides one of the wheels, a pinion 17, $17^1$, $17^2$, etc., rigidly secured to the corresponding wheel. Opposite each pinion lies a gear 15, $15^1$, $15^2$, etc., constituting a measuring element, and, in turning, each of said gears actuates an adding mechanism in a manner well-known to the art and therefore not shown, by means of a roller 18, secured to said gear, together with the usual measuring band 19, which latter is adapted to be wound up on the roller 18. The gears 15, $15^1$, $15^2$, etc., are carried each on one of the arms of two-armed levers 14, $14^1$, $14^2$, etc., the other arms of which carry weights 16, $16^1$, $16^2$, etc., respectively. Levers 14, $14^1$, etc. swing on a fixed shaft 13, the weights 16, $16^1$, etc. tending to bring the gears 15, $15^1$, etc. into mesh with the corresponding pinions 17, $17^1$, etc. But this is prevented, in the position of the parts shown in the drawing, by the mechanism which will now be described.

On the free end of the lever 11, carrying the first measuring wheel, is mounted a set-screw $11^1$, against which bears, under the influence of the weight 16, a T-shaped lug 20 of the lever 14. The set-screw $11^1$ is so adjusted that the gear 15 is just out of mesh with the pinion 17. The lug 20 bears also on a second set-screw $11^4$, which is adjustably mounted in a cross-piece 21, forming the free end of the lever $11^2$. Said piece 21 carries also another set-screw $11^5$, against which bears, under the influence of the weight $16^1$, a T-shaped lug $20^1$ of the lever $14^1$. The lug $20^1$ also bears on another set-screw $11^6$, which is adjustably mounted in a cross-piece $21^1$, forming the free end of the lever $11^3$. The set-screws $11^5$ and $11^6$ are likewise so adjusted that the gear $15^1$ is just out of mesh with the pinion $17^1$. In this way, each gear 15, $15^1$, etc., is dependent upon two set-screws, which are connected with two adjacent measuring wheels. The measuring movement of a gear 15, $15^1$, etc., can therefore only take place when two adjacent measuring wheels stand in contact with the surface to be measured.

The operation of the machine will now be explained with reference to Fig. 3.

When the piece of leather is drawn under the measuring wheels in the direction of the arrow, the measuring wheel $10^6$ and the lever $11^7$ in connection therewith will be the first affected. The lever $11^7$ is lifted by the resulting movement from the lugs $20^5$ and $20^6$, but since these lugs are also under control of the levers $11^6$ and $11^8$, the measuring movement is not initiated. As the piece of leather progresses, however, the measuring wheel $10^5$ is lifted and with it its associated lever $11^6$. The lug $20^5$ is now freed and the measuring mechanism begins to function. The further development of the measuring process is evident from Fig. 3.

As is further evident the measuring movement for each of the imaginary strips which should properly begin and end at the point of intersection of the leather edge and the median of the respective strip, is initiated too late and terminated too soon. A small negative error thereby arises which corresponds to the breadth of the interval between the measuring wheels (see the portions cross-hatched with solid lines, Fig. 3). On this account the breadth of the measuring wheels should be as large as possible in proportion to the breadth of the intervals. In this connection it should be pointed out that this relation is not correctly shown in Fig. 2, the intervals having been extended for purposes of illustration.

If the measuring wheels 10, $10^1$, $10^2$, etc., each controlled only a single measuring element, substantial errors of measurement would occur as shown in Fig. 3 by the portions cross-hatched with broken lines. This error corresponds to the breadth of the measuring wheels and is positive.

I claim:

In a surface measuring machine for leather or the like, a mechanical train for an instrument comprising a plurality of levers movably supported and spaced side by side in series, work contacting rollers arranged one between each pair of adjacent levers and each mounted on one of said adjacent levers, an indicating mechanism, a plurality of revoluble means adapted to be actuated from said rollers and to transmit the received motion to said indicating mechanism, movable supports for each of said transmitting means, a single abutment device on the first lever of the series, dual abutment devices on each of the other levers of the series and abutting devices on each of said supports, the one of two adjacent abutting devices being adapted to abut the one part of the dual abutment devices and the other being adapted to abut the other part of said dual abutment devices.

The foregoing specification signed at Essen, Germany, this 24th day of January, 1922.

HERMANN THUN.